Figure 1:
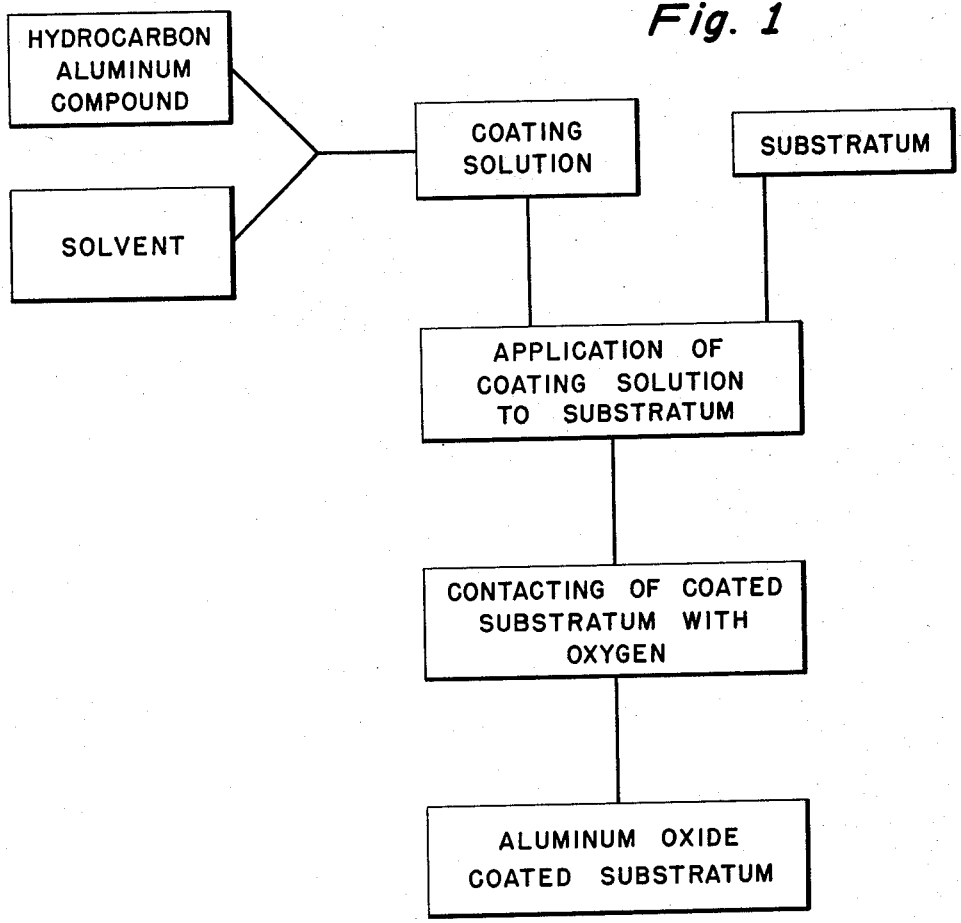

INVENTOR.
Edwin F. Peters

United States Patent Office 3,119,710
Patented Jan. 28, 1964

3,119,710
PROCESS OF APPLYING AN ALUMINUM OXIDE COATING FROM A HYDROCARBON ALUMINUM COMPOUND
Edwin F. Peters, Lansing, Ill., assignor to Standard Oil Company, Chicago, Ill., a corporation of Indiana
Filed May 31, 1961, Ser. No. 113,602
4 Claims. (Cl. 117—62.1)

The present invention relates to a process for applying a film to a surface and more particularly to a method for applying a film comprising aluminum oxide as a surface coating on a supporting material. The invention is especially valuable for providing an adherent aluminum oxide surface which serves as a base layer for application of other films such as paint, varnish, resinous film, and the like.

It is known to prepare stable, insoluble, adherent polyoxide films by coating a surface with organic metal esters and then allowing these ester films to hydrolyze by contact with water vapor. These hydrolyzed ester film coatings, consisting for example of polyoxides of titanium, zirconium, antimony, aluminum, etc., have been found to be useful as adhesion promoters in the formation of various laminates.

I have now found that an improved adhesion promoting film can be obtained by forming a non-aqueous fluid preparation of a hydrocarbon aluminum compound, coating a non-fluid surface with the resulting solution, exposing the coating to an atmosphere containing oxygen and to temperatures between room temperature and 300° C. until any volatile solvents have substantially evaporated and oxidation of said hydrocarbon aluminum compound has occurred, thereby forming an adherent aluminum polyoxide coating on said non-fluid surface.

The present process for the preparation of adhesion promoting films differs from the prior art processes in that the hydrocarbon aluminum compounds which I employ are characterized by at least one carbon-metal chemical bond, and are thus properly characterized as true organo-metallic compounds. Surprisingly, utilization of these hydrocarbon aluminum compounds for formation of adherent coatings which act as adhesion promoters is far superior to coatings prepared from the known aluminum alcoholates, which are characterized by aluminum-oxygen-carbon chemical bonds, and which can be hydrolyzed to form adhesion promoting films. While it might be expected that hydrolysis of the metal esters of the prior art would give films of substantially the same composition as those obtained by oxidation of hydrocarbon aluminum compounds of the present invention, it is recognized that the conversion to the oxide in either case is accompanied or succeeded by a complex condensation polymerization resulting in the desired polyoxide film. Although no theoretically sound basis can be suggested for the superiority of the films formed by oxidation of hydrocarbon aluminum compounds, it is possible that their greater reactivity (as compared to aluminum alcoholates), results in a much stronger internal structure in the polyoxide networks and a stronger bond with the substrate.

In any event, I have found that a surface treated with hydrocarbon aluminum compounds, e.g. aluminum trialkyls or aluminum triaryls, preferably applied to the surface in solution in suitable solvents and then exposed to air (oxygen) deposits a thin very strongly bound surface of alumina. This treated surface readily takes all forms of coatings, and the coatings are bound much more firmly than possible upon the untreated surface. Even highly polished glass or quartz surfaces can be easily coated with a thin, strongly adherent film of alumina by treating the surface with diulte solutions of hydrocarbon aluminum compounds in a solvent such as n-heptane, and exposing the treated surface to air at room temperature. The deposited alumina coating is not removed by ordinary washing and resists removal even upon abrasion with such materials as steel wool, abrasive powders, etc.

In accordance with the process of my invention, hydrocarbon aluminum compounds dissolved in suitable solvents are applied to the surfaces to be treated at temperatures of between about 0° C. and about 150° C. by dipping, spraying or other conventional means for applying thin liquid films to solid substrates. The hydrocarbon aluminum compounds which can be used in practicing the invention include organo-aluminum compounds having at least one carbon to aluminum bond such as aluminum dialkyls or diaryls or aluminum trialkyls or triaryls. In general, these aluminum compounds have the general formula

where R is a member selected from the group consisting of alkyl radicals and aryl radicals and X and X' are members selected from the group consisting of hydrogen, alkyl radicals, aryl radicals, halogen atoms, alkoxy radicals, aryloxy radicals, secondary amino radicals, secondary acid amide radicals, mercapto radicals, thiophenol radicals, radicals of carboxylic acids and radicals of sulfonic acids. Dialkyl aluminum halides and alkyl aluminum halides and equimolar mixtures thereof, e.g. alkyl aluminum sesquihalides are among the compounds suitable for the purposes described herein. The most commonly used aluminum compounds are aluminum tri-hydrocarbon compounds wherein the hydrocarbon radicals may be the same or different monovalent hydrocarbon radicals. Examples of suitable R groups include an aryl radical, aliphatic hydrocarbon radical or derivative, such as alkyl, cycloalkylalkyl, cycloalkenyl-alkyl, aryl-alkyl, cycloalkyl, alkyl-cycloalkyl, aryl-cycloalkyl, cycloalkyl alkenyl, alkyl-aryl or cycloalkyl-aryl radicals.

Specific exampes of R groups for substitution in the above formula include methyl, ethyl, n-propyl, isopropyl, isobutyl, n-amyl, isoamyl, hexyl, n-octyl, n-dodecyl, and the like; 2-butenyl, 2-methyl-2-butenyl and the like; cyclopentyl-methyl, cyclohexyl-ethyl, cyclopentyl-ethyl, methylcyclopentyl-ethyl, 4-cyclohexenylethyl and the like; 2-phenylethyl, 2-phenylpropyl, alpha-naphthylethyl, methylnaphthylethyl, and the like; cyclopentyl, cyclohexyl, 2,2,1-bicycloheptyl, and the like; methylcyclopentyl, dimethylcyclopentyl, ethylcyclopentyl, methylcyclohexyl, dimethylcyclohexyl, ethylcyclohexyl, isopropylcyclohexyl, 5-cyclopentadienyl and the like; phenylcyclopentyl, phenylcyclohexyl, the corresponding naphthyl derivatives of cycloalkyl groups, and the like; phenyl, tolyl, xylyl, ethylphenyl, xenyl, naphthyl, methylnaphthyl, dimethylnaphthyl, ethylnaphthyl, cyclohexylphenyl and the other $AlR_3$ compounds of the type disclosed and suggested in German Patent No. 878,560.

While it is possible to prepare adhesion promoting films, and place them upon a surface to be coated without employing a solvent, it is generally more feasible to dissolve the hydrocarbon aluminum compound in a suitable solvent. The solvent is preferably characterized as inert, that is, non-reactive with the hydrocarbon aluminum compound, and volatile, although some of the higher boiling solvents may be used since it is within the scope of the invention to employ heat which will vaporize many solvents. Among the preferred solvents are included hexane, cyclohexane, octane, xylene, benzene, petroleum ether, mineral spirits and the like. The solvents employed should be anhydrous, but commercially available solvents are usually sufficiently free of moisture to be used for the herein described purpose.

In practicing the invention, solutions of hydrocarbon aluminum compound in the inert solvent are prepared having a concentration of 0.01 to about 25 weight percent, preferably between about 1.0 and about 10 weight percent aluminum compound, and this solution is used to coat the surface to be treated by dipping, spraying or the like. Preferably, the surface is coated at temperatures between about 0° C. and about 150° C., and the solvent permitted to evaporate in an oxidizing atmosphere. Higher temperatures may be employed where necessary, for example up to about 300° C. to speed up evaporation of the solvent and promote rapid formation of the desired film, and the particular temperature employed will be dependent upon the particular solvent used, the material of which the susbtrate is composed, etc. These operations can be repeated as many times as is desired to develop the coating thickness desired.

Figure 2:
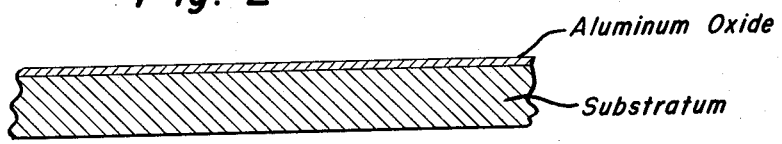

The process of my invention can be more readily understood by reference to FIGURE 1 of the drawing. The hydrocarbon aluminum compound and a suitable solvent are mixed together in the desired proportions to form a coating solution. As pointed out hereinbefore, the use of a solvent is not an absolute necessity but is often desirable in order to promote ease of handling. The coating solution is applied to the supporting material, or substratum, by any of the means discussed hereinabove. Next the coated substratum is exposed to oxygen, whereupon the hydrocarbon aluminum compound is converted to an oxide of aluminum which adheres extremely tightly to the substratum. A representation of the thus obtained alumina-coated surface is presented in FIGURE 2.

Some of the specific applications of this invention are illustrated in the following non-limitative examples.

*Example 1*

A solution of 2.42 g. of aluminum triethyl in 50 ml. of dry benzene was employed to coat 16 gauge (0.064 inch) aluminum test strips, 1-inch wide and six inches long. The aluminum test strips were immersed in the solution for five minutes, removed, and dried in air at ambient temperature. A white film formed over the surface of the strips. This operation was repeated three more times, the dry strips being finally washed with acetone.

The acetone degreased strips prepared as above were bonded with an adhesive having the composition

| | |
|---|---|
| Epon 828 _____grams__ | 7.5 |
| Trimellitic anhydride _____do____ | 2.5 |
| Pyridine _____drops__ | 1 | using ¼ inch overlap joints. The joints were held together under fixed pressure and the strips heated for one-half hour at 300° F. to thermoset the adhesive composition.

The bonded strips were subjected in duplicate to shear tests to determine the shear-tensile strength of the joint. Identical degreased strips which were not treated with aluminum triethyl, but similarly bonded, were employed for comparative purposes. The following results were obtained:

| Test | Shear Tensile Strength | |
|---|---|---|
| | AlR$_3$ Treated | Untreated |
| 1 | 3,040 | 2,310 |
| 2 | 2,940 | 1,880 |
| Average | 2,990 | 2,095 |

From the above results, it will be seen that the adhesive strength of the treated aluminum strip was about 50% greater than the strength of the untreated strip.

*Example 2*

The procedure of Example 1 is repeated, except that aluminum isopropoxide is employed as the treating agent in place of aluminum triethyl. The improvement in adhesive bond strength over the untreated test strips is about one-half that obtained by means of the treatment described in Example 1.

*Example 3*

The procedure of Example 1 is repeated, except that aluminum triphenyl is employed as the treating agent in place of aluminum triethyl. The treated surface shows improved adhesive strength.

The improved polyoxide films prepared by the method of this invention are useful as priming coats or adhesion promoting surfaces for the application of layers of other substances. They may be applied to a variety of solid surfaces, including glass, metal, ceramic, plastic and the like, for bonding the same or different materials to one another. Thus, these polyoxide films are useful in the preparation of plastic laminates, in promoting the adherence of plastic films and coatings to solid substrates such as metal or glass, in treating polyethylene, cellulose acetate, polymethylmethacrylate, and the like to provide surfaces suitable for adhesion of thin, metal films, in coating, waterproofing and strengthening of textiles and paper, etc.

It is to be understood that many changes and modifications may be made in the above-described details without departing from the nature and spirit of the invention as set forth in the appended claims.

I claim:

1. A process for preparing a surface of a solid for a subsequent application of an adhesive material comprising applying to said surface a thin film of a composition consisting essentially of a solution of a hydrocarbon aluminum compound having at least one carbon to aluminum bond dissolved in a volatile inert organic solvent, exposing the resulting film to an atmosphere containing oxygen at temperatures between room temperature and 300° C. until volatile solvents present are substantially evaporated and an adherent aluminum polyoxide coating is formed on said surface.

2. Process of claim 1 wherein the hydrocarbon aluminum compound is selected from the group consisting of trialkyl and triaryl aluminum.

3. Process of claim 1 wherein the hydrocarbon aluminum compound is triethyl aluminum.

4. A method of forming a film on a solid surface comprising the steps of coating said surface with a solution consisting essentially of from about 1.0 to about 10 weight percent of a triethyl aluminum in benzene and exposing said coated surface to an oxidizing atmosphere at a temperature up to about 300° C. until the benzene is substantially evaporated and an adherent aluminum polyoxide coating is formed on said surface.

References Cited in the file of this patent

UNITED STATES PATENTS

| | | |
|---|---|---|
| 2,619,433 | Davis et al. | Nov. 25, 1952 |
| 2,804,397 | Goodman | Aug. 27, 1957 |
| 2,880,115 | Drummond | Mar. 31, 1959 |
| 2,943,955 | Brill | July 5, 1960 |
| 3,041,197 | Berger | June 26, 1962 |